US011078834B2

(12) United States Patent
Vazquez

(10) Patent No.: US 11,078,834 B2
(45) Date of Patent: Aug. 3, 2021

(54) ROTARY VALVE CONTINUOUS FLOW EXPANSIBLE CHAMBER DYNAMIC AND POSITIVE DISPLACEMENT ROTARY DEVICES

(76) Inventor: Jesus Vazquez, Bayamon, PR (US)

(*) Notice: Subject to any disclaimer, the term of this patent is extended or adjusted under 35 U.S.C. 154(b) by 0 days.

(21) Appl. No.: 13/317,771

(22) Filed: Oct. 26, 2011

(65) Prior Publication Data
US 2012/0103301 A1 May 3, 2012

Related U.S. Application Data

(60) Provisional application No. 61/455,791, filed on Oct. 27, 2010.

(51) Int. Cl.
| F02B 55/08 | (2006.01) |
| F01C 1/20 | (2006.01) |
| F02B 55/02 | (2006.01) |
| F01C 21/08 | (2006.01) |
| F02B 53/06 | (2006.01) |

(52) U.S. Cl.
CPC ............... *F02B 55/08* (2013.01); *F01C 1/20* (2013.01); *F01C 21/08* (2013.01); *F02B 53/06* (2013.01); *F02B 55/02* (2013.01); *F02B 2730/015* (2013.01); *Y02T 10/12* (2013.01)

(58) Field of Classification Search
CPC .. F01C 1/20; F01C 21/08; F02B 53/06; F02B 55/08; F02B 55/02; F02B 2730/015; Y02T 10/17
See application file for complete search history.

(56) References Cited

U.S. PATENT DOCUMENTS

| 2,722,201 A | * | 11/1955 | Muse | ...................... F02B 53/00 |
| | | | | 123/232 |
| 3,846,055 A | * | 11/1974 | Brundage | ..................... 418/124 |

(Continued)

FOREIGN PATENT DOCUMENTS

FR 822640 A * 1/1938 ................ F01C 1/20

OTHER PUBLICATIONS

Reuleaux, Franz, and Alex B.W. Kennedy (Ed.), and Alex B.W. Kennedy (Trans.); Pappenheim Chamber Wheel Mechanism; Kinematics of Machinery : Outlines of a Theory of Machines (p. 403); 1876, Macmillan and Co., London; http://kmoddl.library.cornell.edu/model.php?m=49.

(Continued)

*Primary Examiner* — Mary Davis

(57) ABSTRACT

A Revolving piston rotary annular cylinder rotary valve continuous flow and combustion expansible chamber devices, engine machine systems with an outer annular cylinder housing assembly having a central axis, having one or a plurality of balanced pistons attached to a rotor within of the outer housing whereby, a plurality of relatively air tight compartments are formed between the interior surface of the outer housing, the outer surface of the rotor and piston assembly with the volume of said compartment varying as a function of the rotative position of the inner cylinder and rotor piston assembly in relation to the rotary isolating valve connected at one end to the housing upstream before the intake port, another end of valve being in rotary contact with outer peripheral surface of piston and said rotor assembly having an inlet for receiving any fluid and an outlet for providing said fluid.

11 Claims, 12 Drawing Sheets

(56) References Cited

U.S. PATENT DOCUMENTS

| | | | | |
|---|---|---|---|---|
| 3,863,610 | A * | 2/1975 | Spinnett | F01C 1/20 123/204 |
| 3,965,697 | A * | 6/1976 | Beierwaltes | 62/402 |
| 4,086,880 | A * | 5/1978 | Bates | 123/232 |
| 4,519,206 | A * | 5/1985 | van Michaels | F02B 53/02 123/204 |
| 4,548,171 | A * | 10/1985 | Larson | F02B 53/06 123/230 |
| 4,822,265 | A * | 4/1989 | Johnson | F04C 2/3441 418/182 |
| 6,003,486 | A * | 12/1999 | Vanmoor | F01C 1/20 123/249 |
| 6,488,004 | B1 * | 12/2002 | Adamovski | 123/232 |
| 6,543,406 | B1 * | 4/2003 | Pohjola | F01C 1/20 123/228 |
| 7,201,134 | B2 * | 4/2007 | Guest et al. | 123/232 |
| 2002/0014218 | A1 * | 2/2002 | Beal | 123/249 |
| 2002/0150481 | A1 * | 10/2002 | Adamovski et al. | 417/310 |
| 2005/0109309 | A1 * | 5/2005 | Lockett | F01C 1/123 123/202 |
| 2006/0101800 | A1 * | 5/2006 | Rom | 60/39.6 |
| 2006/0150946 | A1 * | 7/2006 | Wright | F01C 1/20 123/231 |
| 2007/0235002 | A1 * | 10/2007 | Blank | F02B 11/00 123/275 |
| 2008/0190395 | A1 * | 8/2008 | Rom et al. | 123/241 |
| 2009/0180939 | A1 * | 7/2009 | Hagen | F01K 21/047 422/600 |
| 2009/0223480 | A1 * | 9/2009 | Sleiman | F01C 1/3446 123/243 |
| 2009/0229787 | A1 * | 9/2009 | Lurtz | F01C 1/14 165/45 |
| 2009/0255506 | A1 * | 10/2009 | Walker | 123/212 |
| 2009/0257898 | A1 * | 10/2009 | Forgy et al. | 418/1 |
| 2012/0251374 | A1 * | 10/2012 | Peitzke et al. | 418/259 |

OTHER PUBLICATIONS

Reuleaux, Franz, and Alex B.W. Kennedy (Ed.), and Alex B.W. Kennedy (Trans.); Root's Blower Chamber Wheel Mechanism; Kinematics of Machinery: Outlines of a Theory of Machines (p. 411); 1876, Macmillan and Co., London; http://kmoddl.library.cornell.edu/model.php?m=51.

Reuleaux, Franz, and Alex B.W. Kennedy (Ed.), and Alex B.W. Kennedy (Trans.); Co-rotating Spiral Pump; Kinematics of Machinery: Outlines of a Theory of Machines (p. 414); 1876, Macmillan and Co., London; http://kmoddl.library.cornell.edu/model.php?m=237.

Reuleaux, Franz, and Alex B.W. Kennedy (Ed.), and Alex B.W. Kennedy (Trans.); Evrard Ventilator; Kinematics of Machinery: Outlines of a Theory of Machines (p. 416); 1876, Macmillan and Co., London; http://kmoddl.library.cornell.edu/model.php?m=53.

Reuleaux, Franz, and Alex B.W. Kennedy (Ed.), and Alex B.W. Kennedy (Trans.); Repsold's Pump; Kinematics of Machinery: Outlines of a Theory of Machines (p. 417); 1876, Macmillan and Co., London; http://kmoddl.library.cornell.edu/model.php?m=54.

Reuleaux, Franz, and Alex B.W. Kennedy (Ed.), and Alex B.W. Kennedy (Trans.); Dart's Chamber Wheel Mechanism; Kinematics of Machinery: Outlines of a Theory of Machines (p. 420); 1876, Macmillan and Co., London; http://kmoddl.library.cornell.edu/model.php?m=55.

* cited by examiner

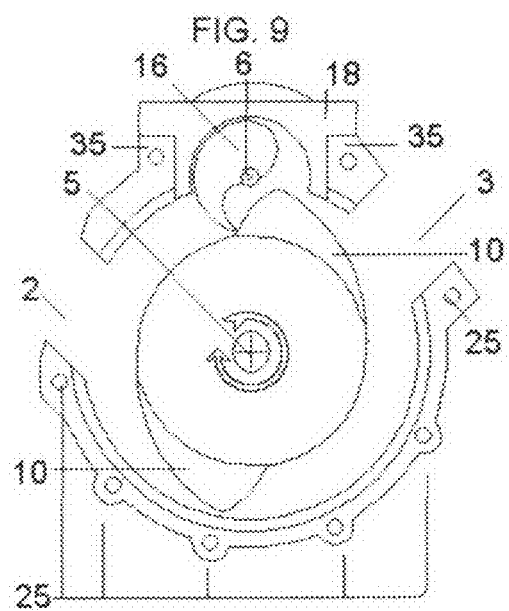
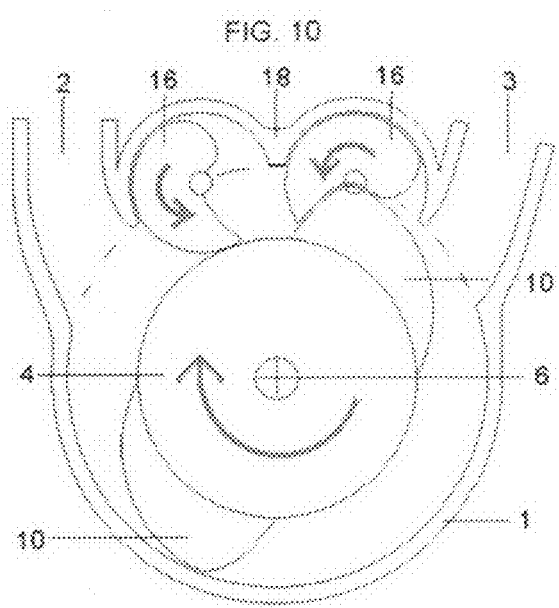
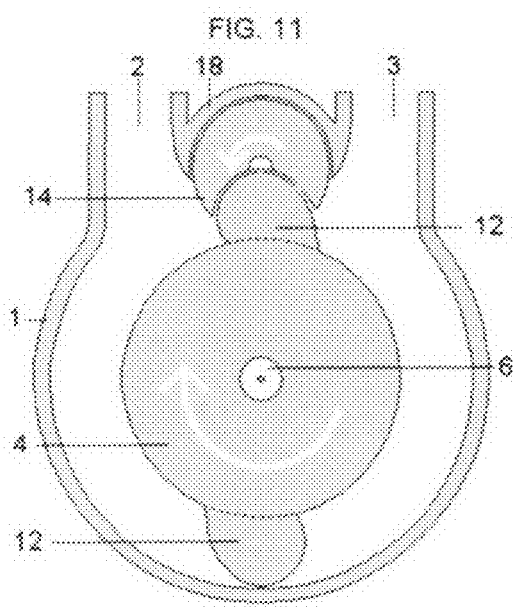
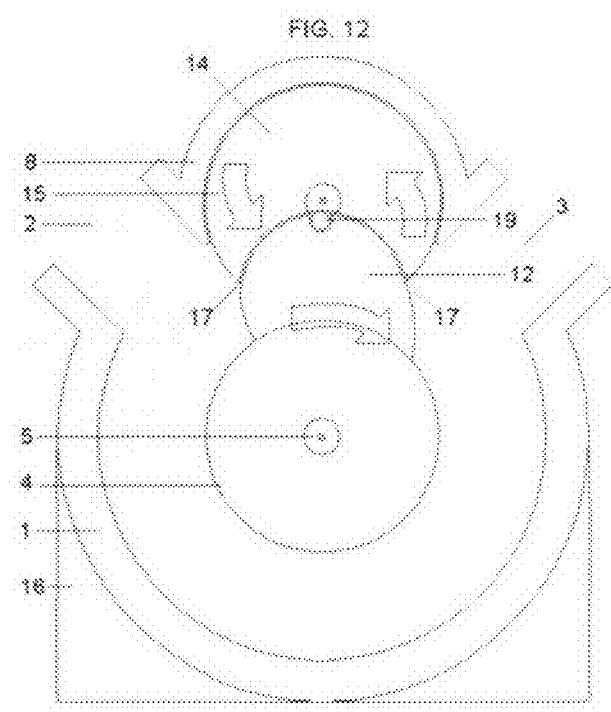

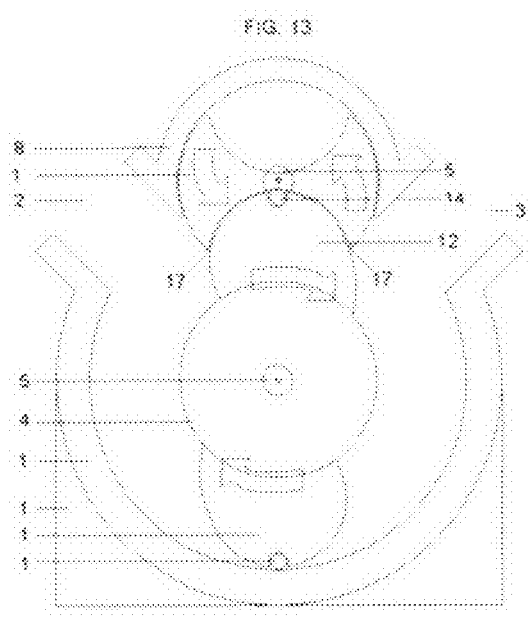
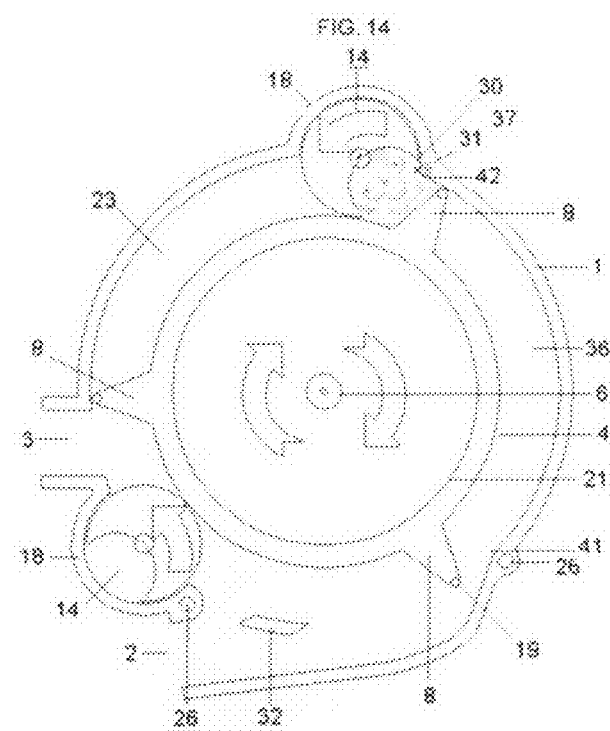
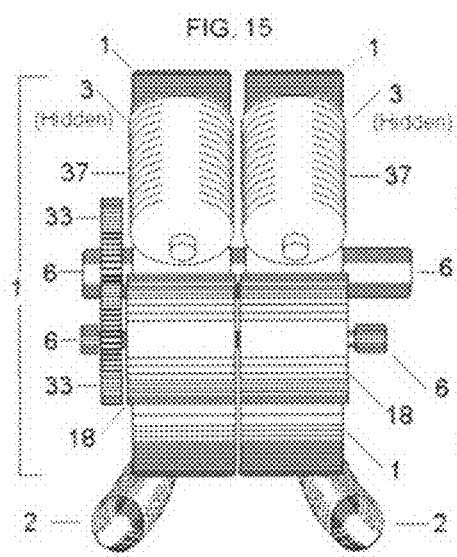
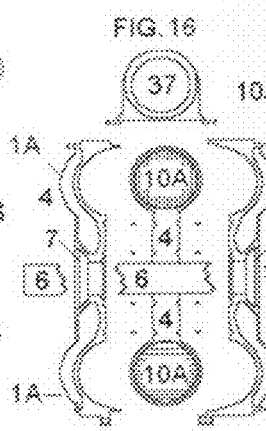
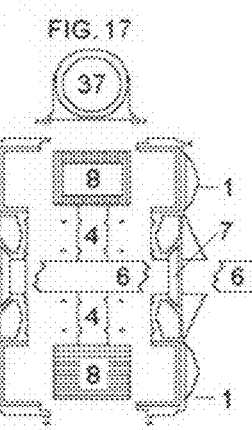

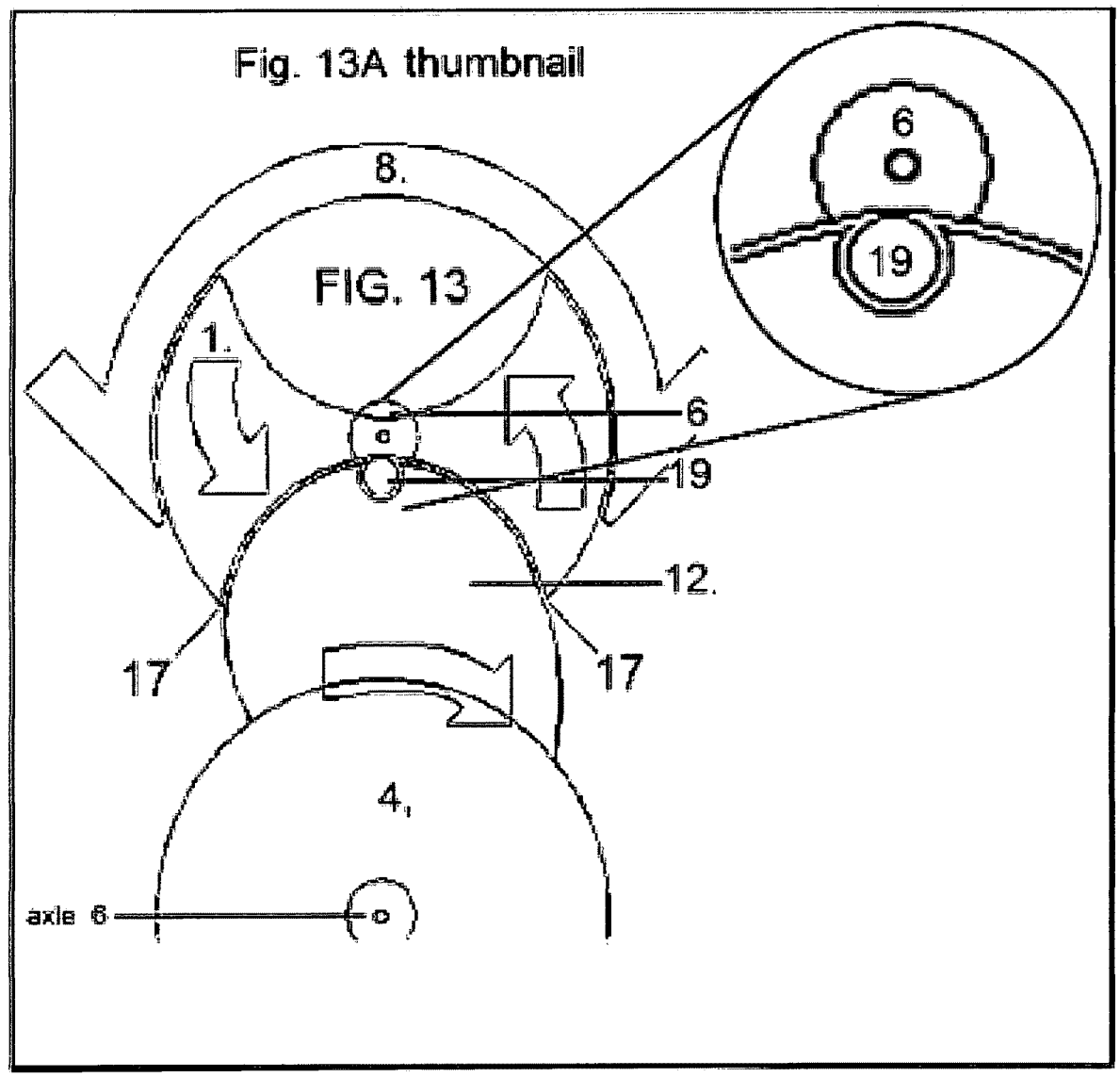

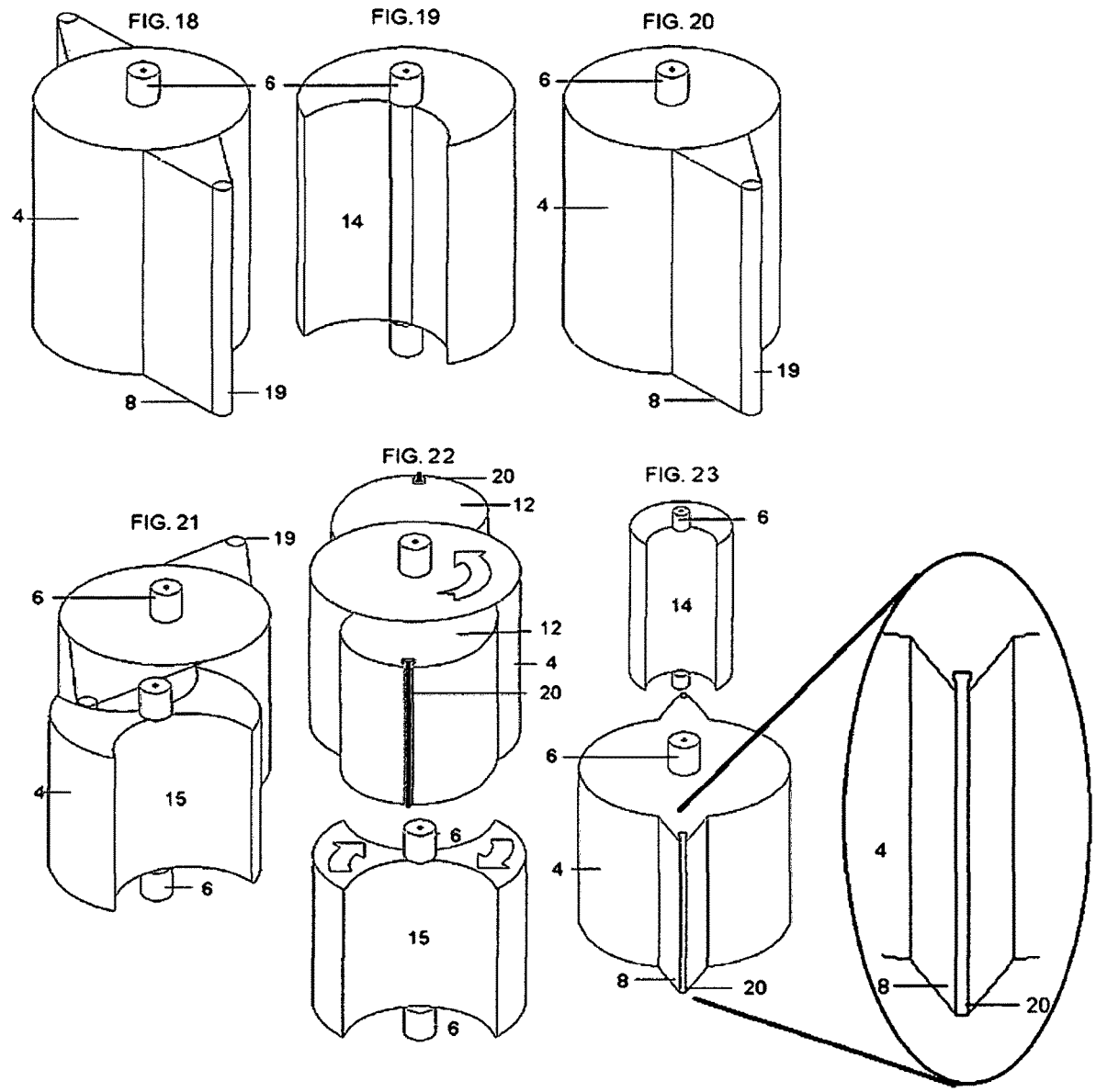

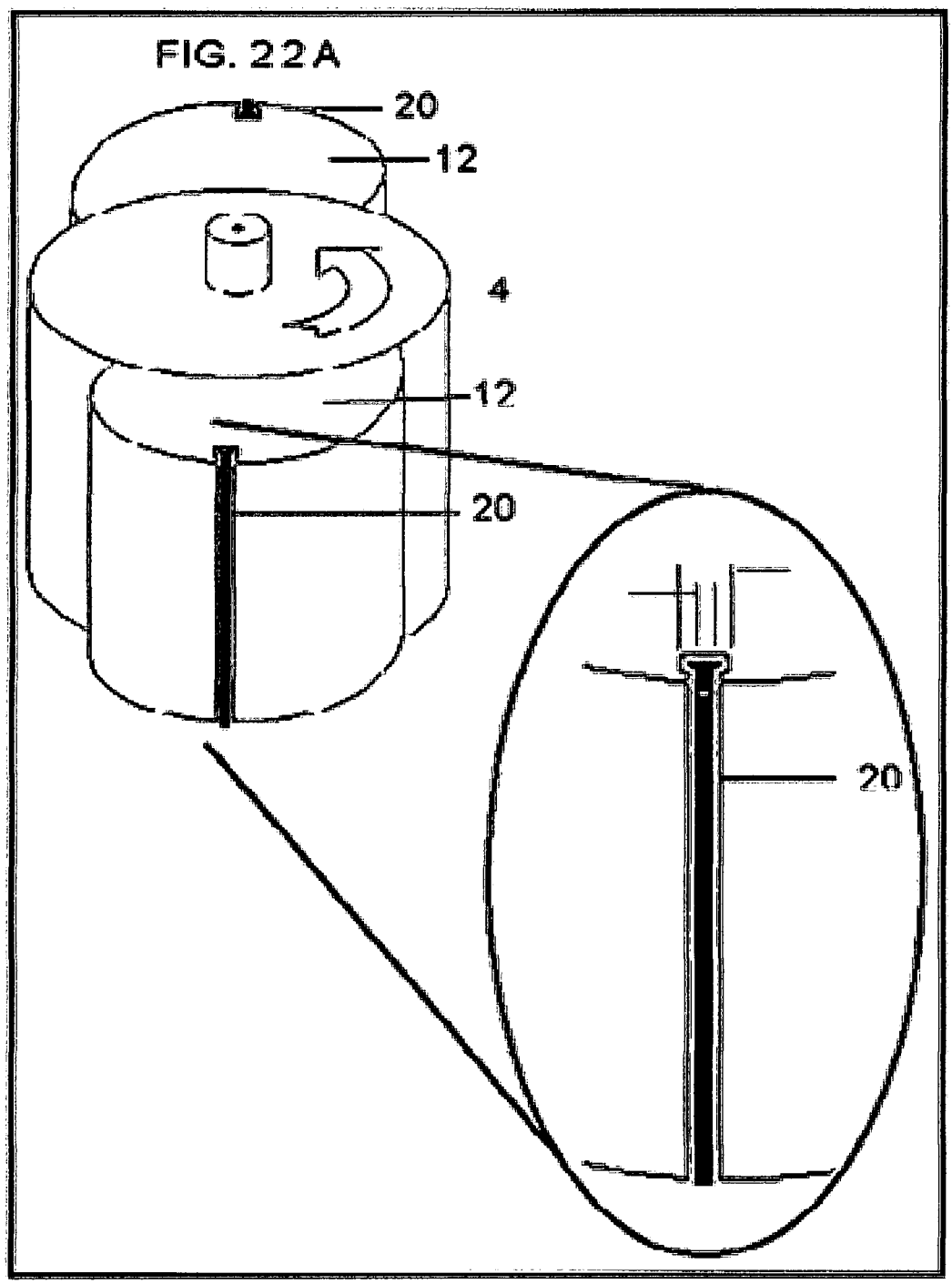

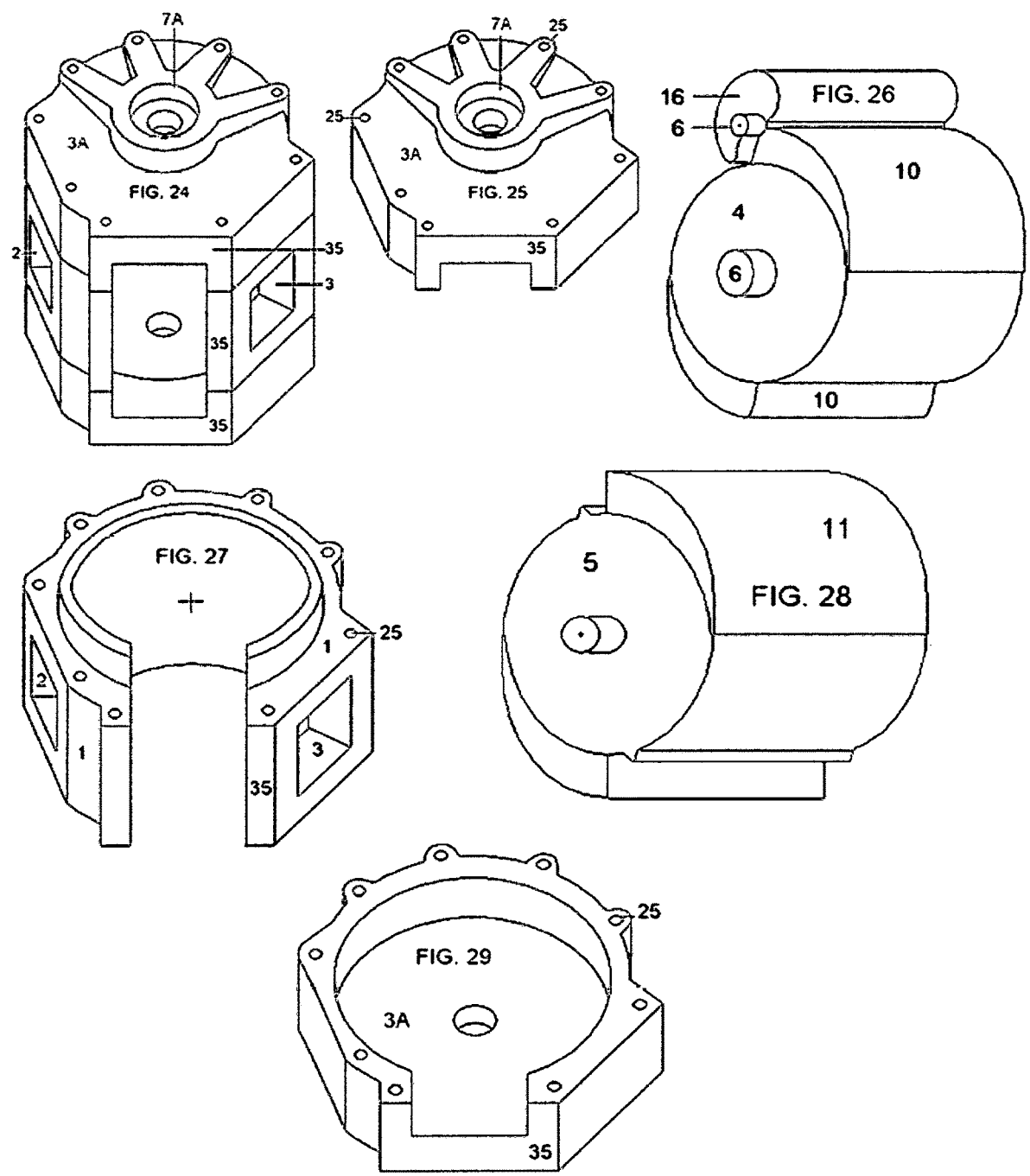

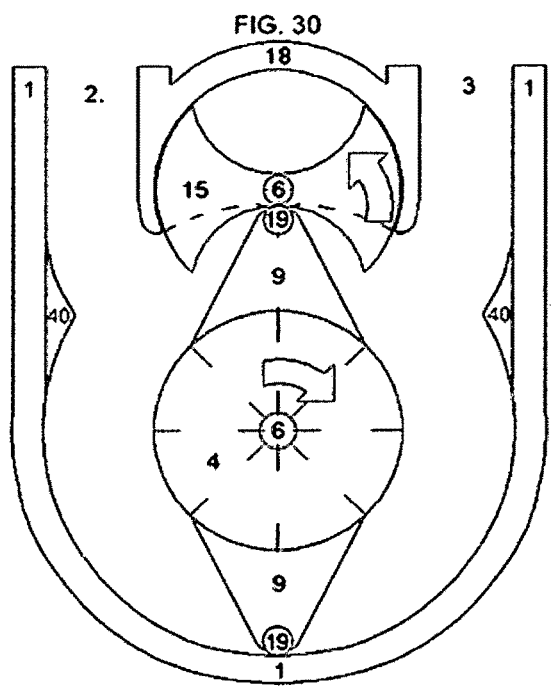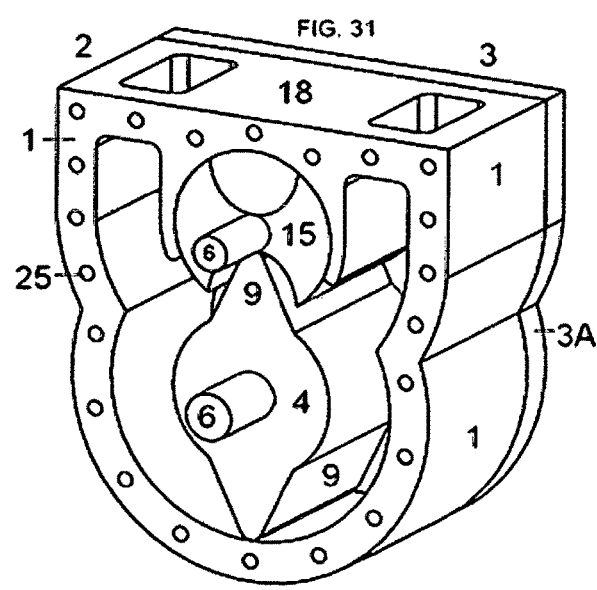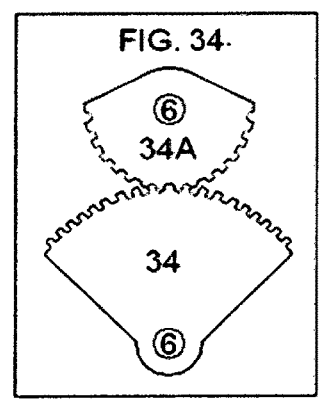

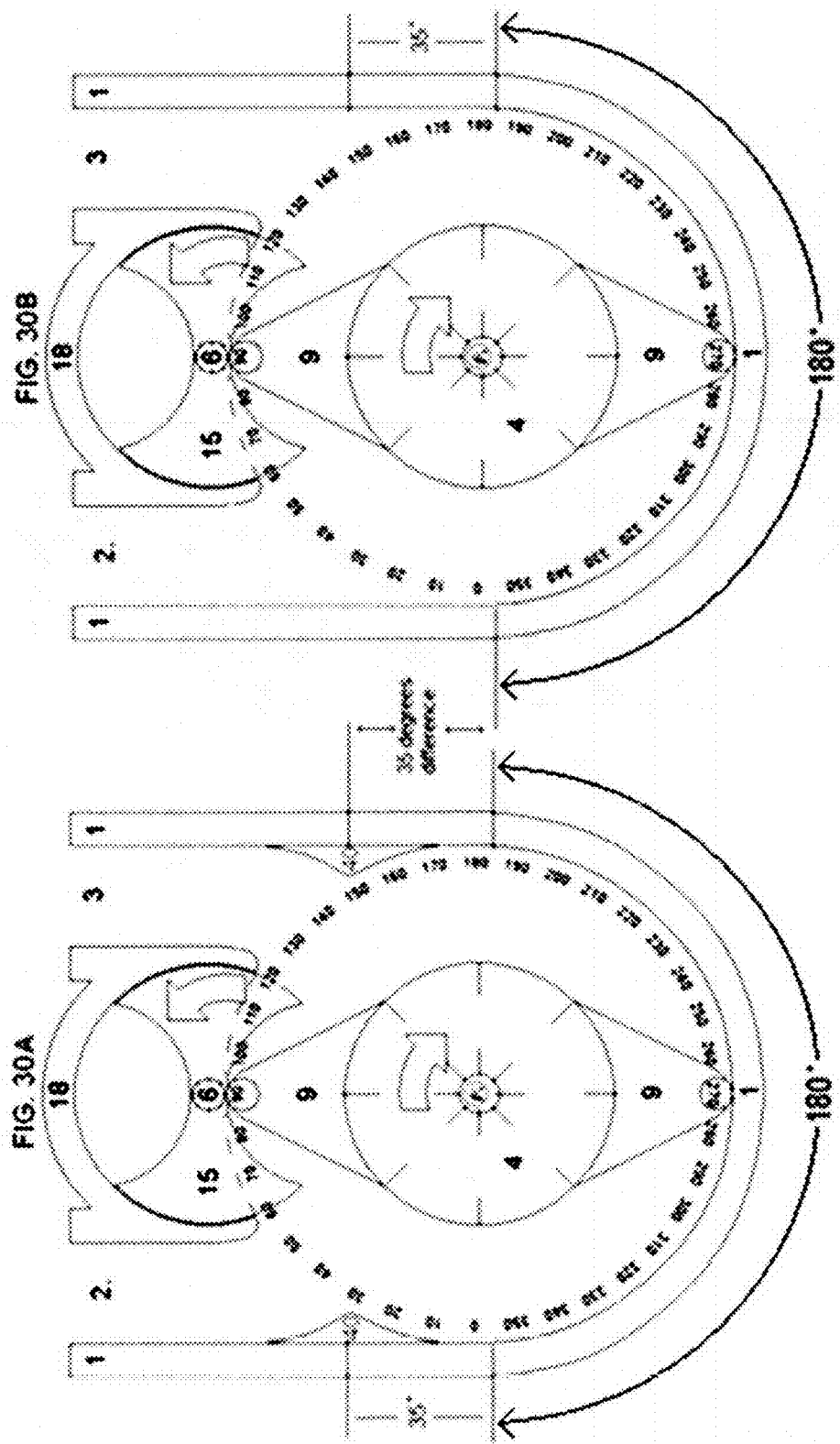

FIG.32
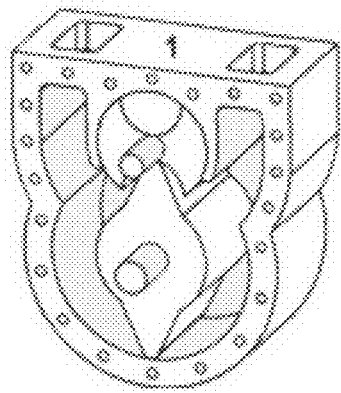
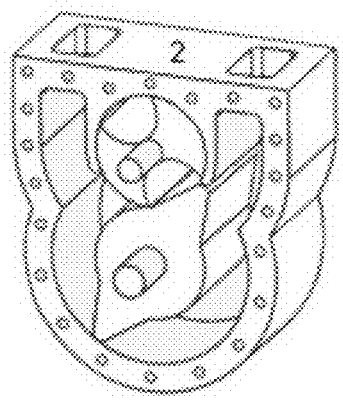
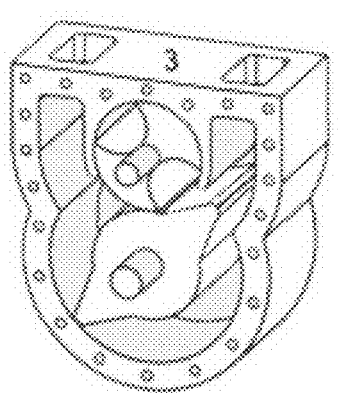
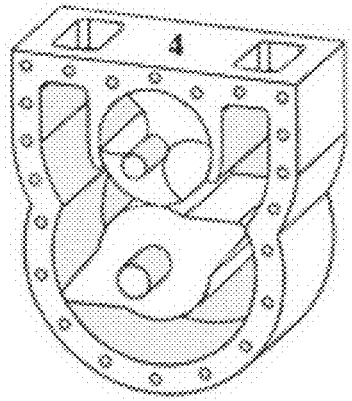
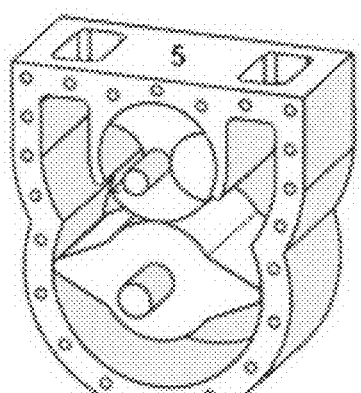
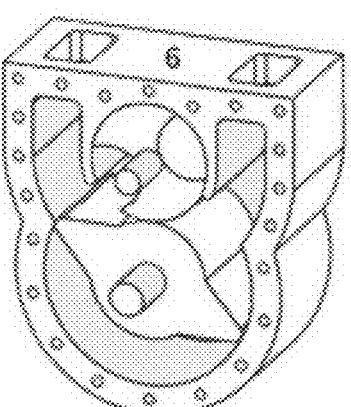
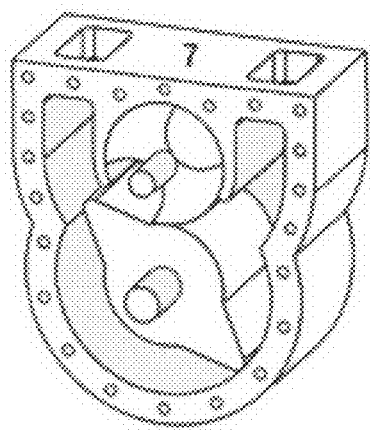
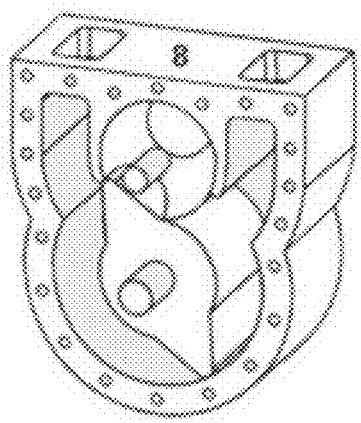
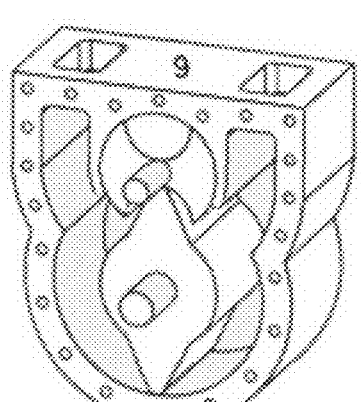

ROTARY VALVE CONTINUOUS FLOW EXPANSIBLE CHAMBER DYNAMIC AND POSITIVE DISPLACEMENT ROTARY DEVICES

CROSS REFERENCE TO RELATED APPLICATIONS

Provisional patent application No. 61/455,873 confirmation number 6690 filing date Oct. 27, 2010
Related to previous U.S. Pat. No. 6,854,437 issue date Feb. 15, 2005 Jesus Vazquez

STATEMENT REGARDING FEDERALLY SPONSORED RESEARCH OR DEVELOPMENT

NOT APPLICABLE

INCORPORATION BY REFERENCE OF MATERIAL SUBMITTED OR ON A COMPACT DISK

NOT APPLICABLE

BACKGROUND OF THE INVENTION

1. Field of the invention

This invention in its embodiment as a rotary internal combustion engine would be the first truly significant new internal combustion engine design since the Belgian-born engineer, Jean Joseph Étienne Lenoir in 1858 invented and patented (1860) a double-acting, electric spark-ignition internal combustion engine fueled by coal gas.

In 1863, Lenoir attached an improved engine (using petroleum and a primitive carburetor) to a three-wheeled wagon that managed to complete an historic fifty-mile road trip.

Alphonse Beau de Rochas, a French civil engineer, patented but did not build a four-stroke engine (French patent #52,593, Jan. 16, 1862).

In 1876 German engineer Nikolaus August Otto invented and later patented a successful four-stroke engine, known as the "Otto cycle engine". Otto built the first practical four-stroke internal combustion engine by incorporating a compression cycle.

That was followed by the invention of the Diesel engine by the German engineer, Rudolf Diesel in 1896. Both of the latter are basically the same design: four (4) and two (2) cycle reciprocating pistons within straight cylinders in various positions. All these men changed the form of transportation for the entire world. Then came the four cycle Wankel off center eccentric (not a true rotary) engine invented by the German Felix Wankel in 1954.

Pryor to Mr. Wankel the Englishman Sir Frank Whittle registered a patent for a jet Engine, he and the German Dr. Hans von Ohain are both recognized as being the co-inventors of the jet engine. Each worked separately and knew nothing of the other's work. Hans von Ohain is considered the designer of the first operational turbojet engine. Frank Whittle was the first to register a patent for the turbojet engine in 1930. Hans von Ohain was granted a patent for his turbojet engine in 1936. However, Hans von Ohain's jet was the first to fly in 1939. Frank Whittle's jet first flew in in 1941.

The Revolving Piston Rotary Valved Dynamic Displacement Expansible Chamber device embodied as an internal combustion engine overcomes the limitations of gasoline as a fuel and combines the Positive Displacement of the conventional Otto Cycle engine with the dynamic effect of the Jet Turbine engine yielding high torque at low RPM. This device is a new technology that would not displace the current fuel supply infrastructure but would facilitate a shift toward more renewable fuel sources thus having a very positive effect on the environment by helping reduce Green House emissions and because of its efficiency, material cost and relative weight to power ratio etc. This invention in its embodiment as a Rotary Expansible Chamber Device overcomes all of the limitation of other such devices Advantages: More durable and efficient because of it's rotary compartmentalized design that can retain a measurable and constant fluidic volume, as an expansible chamber device it uses minimal pressures and volumes to function and power. This design does not permit the loss, waste or escape (a type of blow by) of fluids before they complete their function as is the case with axial and centrifugal pumps and turbines. This configuration is as a true rotary and thus eliminates the need to overcome inertia and saves momentum while eliminating vibration and displacing more fluid volume per rotation at higher pressures than conventional devices This invention combines the effects of a positive high pressure displacement reciprocating piston pump and or motor with the high volume flow and the dynamic effect of a jet engine without fluidic waste, is much easier to manufacture and has very few parts.

OBJECTS AND ADVANTAGES

A. This engine is more efficient for the following reasons:
1. It is perfectly rotary (unlike the Wankel engine).
2. It combines the positive displacement of a conventional internal combustion engine with the dynamic effect of a jet turbine engine hence the term Dynamic Displacement.
3. Utilizes, does not waste low pressures (contrary to the minimum pressure required by a turbine.
4. Does not utilize a reciprocating motion that wastes energy changing directions (momentum, impetus, inertia).
5. Does not waste energy in cycles such as the four (4) and two (2) cycles of the conventional Otto, Diesel or Wankel engines. In the four (4) cycle engine only one (1) out of four (4) cycles provides power.
6. Does not waste power on a compression cycle.
7. Does not waste power on conventional cam shafts.
8. Does not waste power on conventional valves and springs.
9. Can function without a starter.
10. It can utilize excess heat that would normally be wasted (steam power assist and Thermoelectric devices). In conventional engines the radiator wastes 33% of the fuel's energy (more adiabatic).
11. Utilizes turbo charger(s) to supply oxidizer (air).
12. Utilizes electric fuel pump.
13. Utilizes flywheel effect.
14. Can utilize ultra high efficiency lubricants permanently bonded to critical surfaces with coefficients of friction of only 0.001 as opposed to the conventional 1.0.
15. The possible combinations of various versions that increase efficiency.
16. Design permits the complete control of ratios of fuel to air.
17. Can be combined with electric motor/generator in a hybrid configuration.
18. Because of the nature of the combustion there is no such thing as detonation, piston knock or pre-ignition. This engine compensates for the deficiencies or limitations of gasoline as a fuel. These being: ratios of air to fuel, its relatively low octane content and the tendency for gasoline to produce detonations, piston knock or pre-ignition.

19. Can use many types of fuel.
20. Utilizes gasoline more efficiently.

B. This engine is more durable for the following reasons:

1. Simple design, less moving parts, smaller, lighter, oblique angles.
2. Rotation only in one direction avoids wear caused by changing directions (180 degrees) on the parts. Reciprocating action tends by its nature to hammer the following parts: connecting rods, rings, bushings, bearings, cam shafts, cams, cylinders, pistons, crank shafts, etc.
3. Design permits superior design and function of the piston rings because of one way rotation.
4. Less vibration.
5. Can utilize ultra high efficiency lubricants permanently bonded to the critical surfaces.
6. Forms strong components geometrically designed for maximum strength (annular shapes, toroids, triangles and cones).
7. Controlled operating conditions of the critical parts.
8. Can utilize new materials such as carbon/carbon composites that can resist higher temperatures yet do not expand as much as metal permitting smaller tolerances at the same time being stronger and more malleable.
9. Because of the nature of the engine and its form of combustion there never is ping, piston knock or detonation. The latter being potentially the most destructive for a conventional engine. Piston knock or predetonation is a form of abnormal combustion as hot gases left over from the previous combustion spontaneously detonate. This knock produces a spike of ultra high pressure, a shock wave that can break pistons or rings and radically increase combustion chamber temperature. This increases the possibility that red-hot glowing metal in the combustion chamber will result in pre-ignition, at which point successive combustion events are ignited not by the spark plug, but by the hot spots. Timing is then completely out of control, leading to further temperature rises and the possibility of melted pistons etc.

C. This engine is easier to manufacture for the following reasons:

1. The toroid cylinder is manufactured in two halves, then is put together with gaskets and bolts etc.
2. The water jackets are manufactured and put together in the same way as the cylinders and bolted on over the latter.
3. The design is simple.
4. Can utilize new materials and simplified methods.
5. Would be more economical to manufacture.

Description of related art not applicable

BRIEF SUMMARY OF THE INVENTION

This invention as a revolving piston rotary valve dynamic and positive displacement expansible chamber device as in its internal combustion mode is more efficient due to the following reasons:

It is a rotary engine in its purest form. It does not waste energy in useless vibration caused by off center rotation. It runs on a single compound cycle; that is, there is no compression cycle, no separate exhaust, intake or power cycle because it all happens at the same time. This engine can use any kind of combustible fluid, even adding water to certain fuels would function. This engine overcomes the limitations of gasoline as a fuel while being more efficient in its use. This invention is more durable due to its simple design with very few moving parts (only two in its basic configuration). This invention is also easier to manufacture because it can be made stamped or cast in two halves, then bolted together or joined in some other way making it not only easier to build but also more economical.

The invention can be used in many ways. The following is a list of and the functions of some of its embodiments. Its embodiment as a very efficient internal combustion engine is well documented in these pages, so I will go on to mention some of the others. One of its versions in its internal combustion engine embodiment is that of an air breathing engine. That is an engine that sucks in the air that it will utilize for combustion rather than having the air forced in by some other external mechanical means. In this version, the engine becomes a cycled engine in which not every passing of the piston is imparted by power but rather every other and the spark is timed in a manner as to coincide with this cycle, see FIG. 14. This is one of various versions of this type of air breathing engine and although in this version compression is incorporated into the compound cycle for illustrative and other inclusive purposes; compression is not generally part of the compound cycle as illustrated in various figs. Including FIG. 6 where a back flow pressure relieving and a vacuum release channels are incorporated.

In its embodiment as a pump, as illustrated in FIG. 8, it can be made in many ways. FIG. 8 shows the invention in a two triangular pistons with a conformably shaped square annular cylinder and valve configuration. In other versions of this pump the cylinder can be annular or a torus, the conformably shaped valve can be double; it can have one or a plurality of pistons and rotors and may or may not include a one way pressure valve. It can come in all sizes from nano and micro to macro or gigantic and it can be manufactured of any material that is suitable to its ultimate purpose (metal, ceramics, composites, plastics etc.).

The valve(s) in the designs of the pump embodiments and as with all manifestations of the rotary expansible chamber device, open and close allowing the passage of a piston yet isolating it and fluid from the exhaust port insuring that it that it is pushed and flows only in one direction. Imparting power from the rotation of the attached balanced pistons and rotor to turn the axle shaft from some source, wind, engine or motor device etc. The inlet would draw the fluid into the expanding chamber. Once the fluid is drawn into the chamber it is compartmentalized and sealed in by the valve and the following piston which delivers it to the exhaust port where the valve(s) purge or force it out of the device. All pump embodiments function in this manner.

Conversely the embodiments of the internal combustion engine, the steam engine, the Hydro motor (water engine for hydroelectric and other purposes), the fluid metering devices, the power assist devices, air motors and nanoscopic motors would function in the same manner except that the working fluid or energy would supply the force or pressure to move the piston(s) on the rotor attached to an axle and the rotational power would be derived from the shaft rather than be delivered to it as in the case of the pump As with all the valves in any embodiment of this invention they can be actuated by many means the rotors can be synchronously attached through their shaft to external synchronized gears who's ratios have been determined by the number of pistons and the relative size of the rotor to the rotary valve and in its most basic and simplest configuration the gears cam be incorporated within the structure of the cylinder on the peripheral surface of the rotor and the rotary valve as illustrated in FIG. 33 etc. In these illustrations the rotor and piston rotation is generally in a clockwise direction but in actuality may not be limited to this.

The above variations and those not mentioned whether in size, materials, embodiments and functions, represent the invention in all of its actual and potential manifestations.

BRIEF DESCRIPTIONS OF SEVERAL VIEWS OF THE DRAWINGS

FIG. 1 is a schematic isometric image of one type of the revolving piston rotary valve dynamic displacement expansible chamber device in a single piston with single simple Crescent (parabola) Rotary (isolating transfer chamber) valve in a free Flow Configuration FIG. 2 is a schematic isometric image of the invention in a double triangular piston with piston tip roller bars and a single double crescent parabola rotary valve in a free flow configuration.

Figure 8:
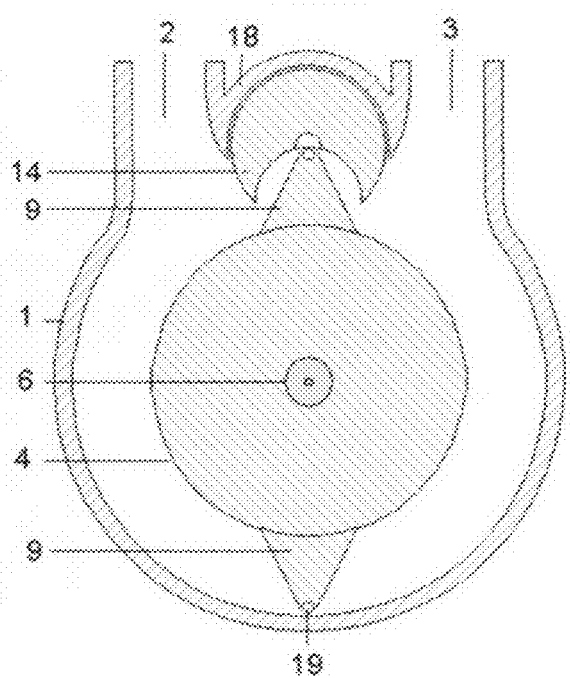

FIG. 8 is a schematic isometric image of the invention as a expansible chamber device with a double triangular piston with a single simple crescent parabola rotary valve in a free flow configuration FIG. 9 is a schematic isometric image of the invention as an internal combustion engine with double sloped back piston and a single ying yang rotary valve in mid compound cycle position (simultaneous power and exhaust).

FIG. 10 is a schematic isometric image of the invention as an expansible chamber device with double sloped back pistons and with a double ying yang rotary valves in the middle of a power and evacuation compound cycle.

FIG. 11 is a schematic isometric image of the invention as an expansible chamber device with a double lobe piston and a single simple crescent rotary valve in a free flow configuration midway between the power and exhaust compound cycle.

FIG. 12 is a schematic isometric image of the invention as a direct flow rotary expansible chamber device with a single lobe piston and a single simple crescent rotary valve.

FIG. 13 is a schematic isometric image of the invention as a direct flow rotary expansible chamber device with two lobe pistons on a rotor and a single double sided crescent rotary valve.

FIG. 13A is a blown up view shown the seal in FIG. 13.

FIG. 14 the invention as a rotary air breathing internal combustion engine with three triangular pistons, a rotor and axle with two single simple crescent rotary valves a lower exhaust purging rotary an intake port, the valve is shown in the ignition position and firing, Fuel air and ignition lines not shown.

FIG. 15 is an exterior view of a coupled double rotor and cylinder continuous internal combustion engine with exterior synchronizing gears, rotor and valve axles, annular cylinders double combustors and exhaust pipes.

FIG. 16 represents an exploded edge view schematic isometric image of circular/circular toroid pistons, rotor and axle in a similarly and conformably shaped toroid cylinder with combustor as a continuous internal combustion engine, not shown are the valves(s), fuel and air intake lines, ignition wires or intake or exhaust ports.

FIG. 17 represents an exploded edge view schematic isometric image of a rectangular toroid piston on rotor and axle in a rectangular toroid cylinder with combustor as a continuous internal combustion engine, not shown are the valve(s), fuel and air intake lines, ignition wires, intake and exhaust ports.

FIG. 18 shows 3D image of double triangular pistons on rotor with friction reducing roller bar.

FIG. 19 shows 3D image of a single crescent rotary valve on axle.

FIG. 20 shows 3D image of single triangular piston on rotor

FIG. 21 shows 3D image of double triangular pistons on rotor with axle in rotational interaction with a double crescent rotary valve and axle with friction reducing roller bar.

FIG. 22 shows 3D image of double lobe piston with piston tip packing seals on rotor and axle and double crescent rotary valve with axle piston tip packing seals FIG. 22A shows a blow up of the piston tip packing seals shown in FIG. 22.

FIG. 23 shows 3D image of a single simple crescent rotary valve and axle above double triangular pistons on rotor with axle with piston tip packing seals.

FIGS. 24-29 are a stylized 3D representation of FIGS. 26, 27, 28 assembled and hollow, bearings, attachments and rotary valve assembly not shown.

FIG. 25 is a stylized 3D representation an exterior cylinder head cap with reinforced and heat dissipating axle bearing area, bearing not shown FIG. 26 shows stylized isometric schematic 3D image of the ying yang rotary valve in synchronized rotational interaction with a conformably shaped sloped back piston on rotor attached to axle FIG. 27 is a stylized 3D representation of a mostly exterior view of a cylinder with intake, exhaust port and valve area.

FIG. 28 is a 3D image of image of the invention in a double sloped back horned piston on rotor and axle.

FIG. 29 is a stylized 3D representation of interior of exterior cylinder head cap as other side of FIG. 25

FIG. 30 shows an image of the invention as convertible free flow Rotary Valve Continuous Flow Expansible Chamber Device with two triangular pistons and piston tip roller bars on a rotor an axle within a cylinder with a single, double crescent rotary valve within a rotary valve housing, an intake and an exhaust port and a cycle extender insert.

FIG. 30A shows the convertible rotary valve continuous flow expansible chamber device with the cycle extender, FIG. 30B shows the convertible rotary valve continuous flow expansible chamber device without the cycle extender.

FIG. 31 shows a 3D open image of the invention as a Rotary Valve Expansible Chamber Device with two triangular pistons on a rotor, an axle within a cylinder a single, double crescent rotary valve an intake port and an exhaust port.

Figure 33:
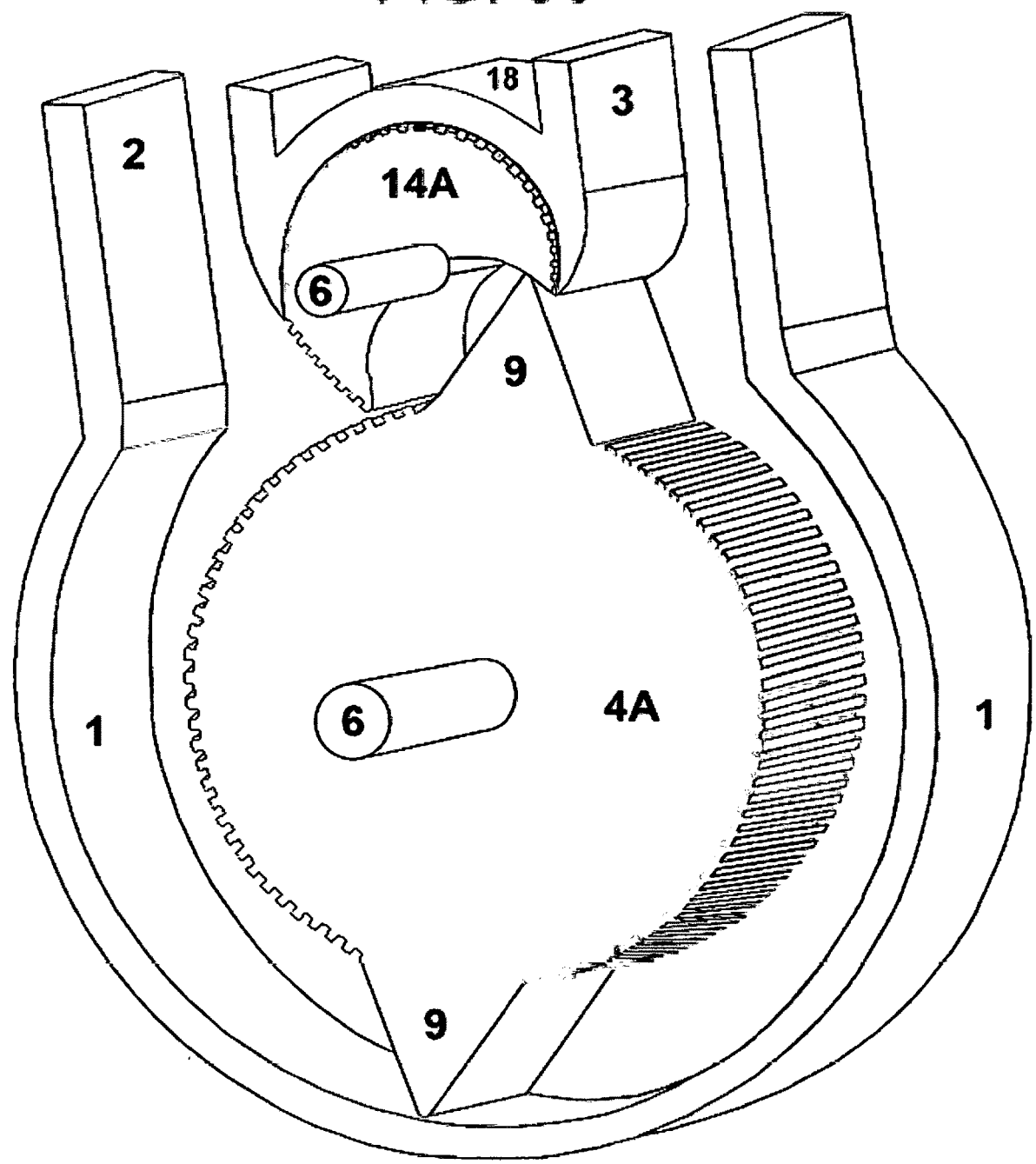

FIG. 32 shows a 3D representation of the invention in sequential images (1 through 9) and the relative rotational functioning of rotary valve to piston/rotor assembly, as in FIG. 33 is a three (3) dimensional representation of a simple version of the invention with the synchronizing gears formed internally as part of the rotor and rotary valve structure FIG. 34 shows an isometric representation of external synchronizing partial gear assembly comprised of an exterior synchronizing rotor/rotary valve partial gear drive and an exterior rotor synchronizing partial gear drive that reinforce compensate for the gap due to the lack of gear teeth on the internal smooth inner areas of said valve transfer lock and said pistons

DETAILED DESCRIPTION OF THE INVENTION

Figure 1:
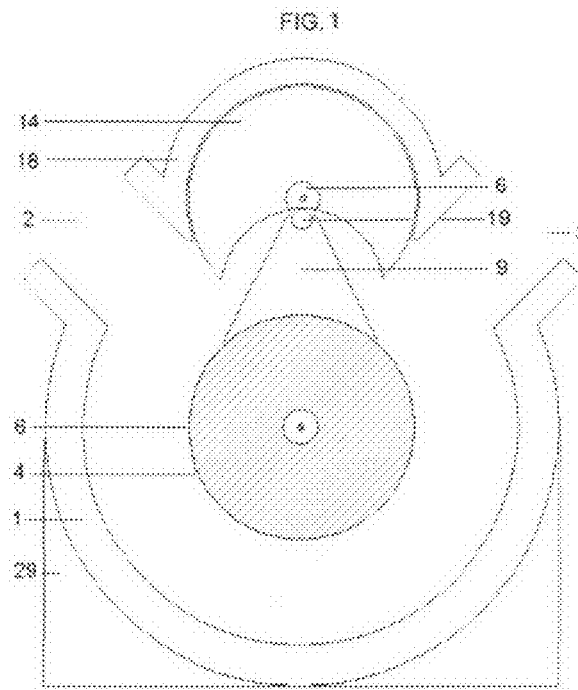

FIG. 1) represents the most basic form of the invention and as with all manifestations of the Rotary Valve Continuous Flow Expansible Chamber and Dynamic Displacement Rotary Devices (RP7VR) they may be powered by a motor, its single triangular piston 9 mounted on its rotor 4 connected to its axle shaft 6 in rotational interaction with its single crescent rotary valve 14 mounted within the smooth inner surface of its rotary valve housing 18 and annular cylinder housing 1 respectively creates a partial vacuum that as it turns draws fluid in through its intake port 3 as the compartmented chamber expands by the effect of the piston 8 traveling through and against said smooth inner surface of the cylinder 1 wall in this case (but not limited to) in a clockwise rotational direction and expelling said fluid by pushing it out through its exhaust port 2 potentially but not necessarily assisted by a one way check valve (not shown) on or near said exhaust port 2. In most cases synchronicity of the rotational interaction between the rotary valve and the rotor with piston(s) is assured and maintained by external meshed gears whose ratios are determined by the relationship and diameters as well as the number of pistons of same (gears not shown) this manifestation might be considered useful as a pumping device such as an artificial heart where the where a viscous fluid such as blood etc. need not be valved contrary to a biological heart there is no contraction and expansion in the usual sense and with very little if any backflow necessitating a valve although a valve may be used.

The gear ratio in this embodiment is one to one (1:1). Likewise an un-motorized version of this embodiment would utilize moving fluid pressure entering through its intake port (3) to push said piston 9 attached to its rotor 4 connected to axle shaft 6 rotably inserted within its annular cylinder 1 to impart rotational force to its axle shaft 6 thereby powering any of a number of devices. Additionally In FIG. 1 the rotating piston 9 interacts with the single crescent rotary valve 14 in a synchronized rotational manner that acts as a piston transfer lock allowing said piston to transit through said valve while isolating and preventing working fluid from re-circulating without exiting through exhaust port 2 and doing its work. The support base/mount 29 secures the annular cylinder housing 1 which in turn supports the rotary valve housing 18, piston tip roller bar 19 attached to the tip of piston 9 seals while reducing friction.

Figure 2:
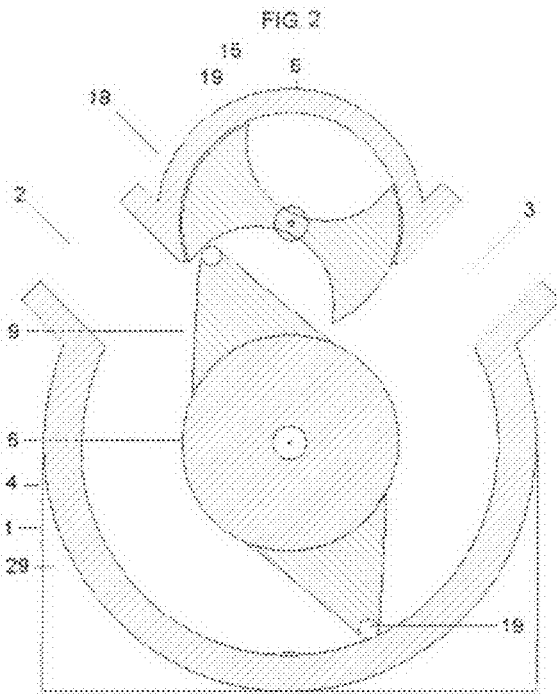

FIG. 2 represents the invention in what I consider will become its more popular embodiment as an expansible chamber device same as FIG. 1 except that it has two balanced triangular pistons 9 instead of one (1) piston 9 with piston tip roller bar 19 (in this case) and a single double crescent rotary valve 15 instead of simply a single crescent rotary valve 14 also this configuration minimizes or eliminates the need for check valves in most applications rotor and rotary gear rotational ratio is also one to one (1:1) as in FIG. 1.

Figure 3:
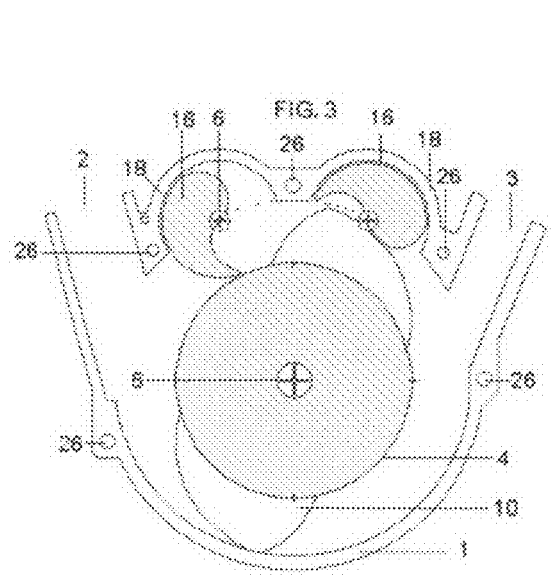
FIG. 3 is a schematic isometric image of the invention as an internal combustion engine with a double sloped back piston in a double ying yang rotary valve configuration with water cooling channels, combustor not shown.

FIG. 3 represents the invention as a rotary internal combustion engine with two balanced sloped back pistons 10 that are attached to their respective rotor 4 and axles 6 that are synchronized rotational interaction with double ying yang rotary valves 16 within their double rotary valve housings 18 midway through its simultaneous power and exhaust compound cycle with water cooling channels 26 that act as a water jacket. The Combustor is not shown. Ratio of valve to rotor is two to one (2:1) respectively.

Figure 4:
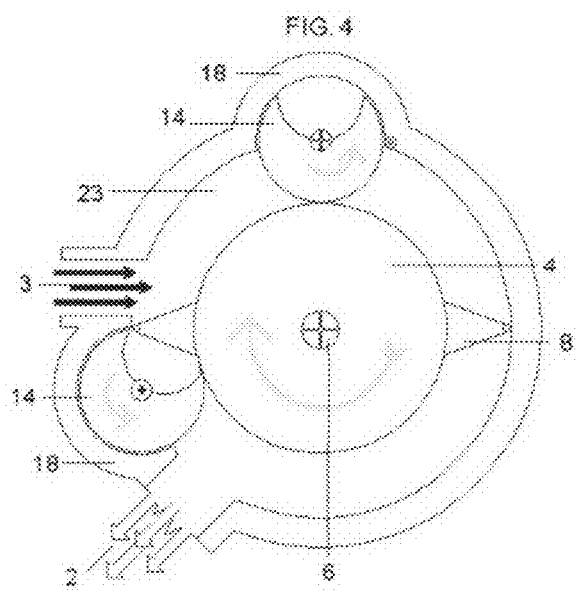
FIG. 4 is a schematic isometric image of the invention as an internal combustion engine with double triangular pistons on rotor with double simple crescent parabola rotary valves in a compound cycle.

FIG. 4 depicts the invention as a two narrow triangular pistons 8 on rotor 4 rotary internal combustion engine with two single crescent rotary valves 14 one of said valves isolates the intake from the exhaust flow allowing the pistons 8 to do their work while the other rotary valve 14 purges the exhaust gases from the annular cylinder just before the compound cycle goes into its compression/admission 23 phase as the opposite piston 8 starts its power/exhaust phase all simultaneously hence the term compound cycle. Not shown is the combustor, the spark and the fuel injection devices or respective supply lines. Ratio of valve to rotor is two to one (2:1) respectively.

Figure 5:
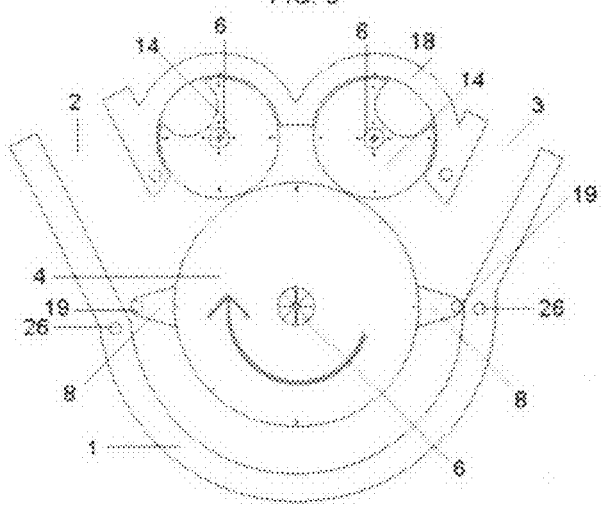
FIG. 5 is a schematic isometric image of the invention as a rotary internal combustion engine with double triangular pistons and two simple crescent parabola rotary valves, combustor not shown.

FIG. 5 shows the invention depicted as a continuous internal combustion engine with double (2) single crescent rotary valves 14 rotationally synchronized with two narrow triangular 8 pistons mounted on their rotor 4 attached to their axle shaft 6 and rotably mounted to the annular cylinder housing 1 said pistons 8 are shown to have piston tip roller bars 19 that reduce friction and wear while sealing the pistons to the annular cylinder 1 thus forming an expansible chamber with water cooling channels 26. Ratio of valve to rotor is two to one (2:1) respectively.

Figure 6:
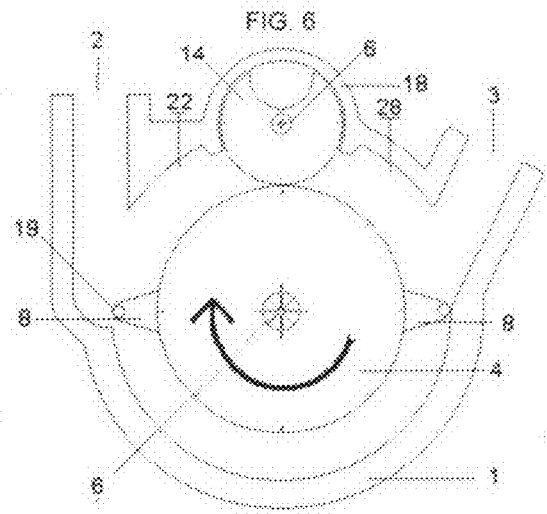
FIG. 6 is a schematic isometric image of the invention as an internal combustion engine in a double triangular piston with single simple crescent rotary valve configuration in an end and beginning power and evacuation compound cycle position combustor not shown.

FIG. 6 describes an internal combustion engine with double narrow triangular pistons 8 on a rotor 4 attached to an axle shaft 6 with one single simple crescent rotary valve 14 in synchronized rotational interaction within an annular cylinder 1 and rotary valve housing 18, having a pressure relieving back flow channel 22 and vacuum relief channel 28 in a compound cycle rotary internal combustion engine said device's intake port 3 and exhaust port 2 as in all internal combustion engine manifestations of this invention are diametrically opposed at 180 degrees so as one piston seals the other releases the combustion gases. Combustor not shown. Ratio of valve to rotor is two to one (2:1) respectively.

Figure 7:
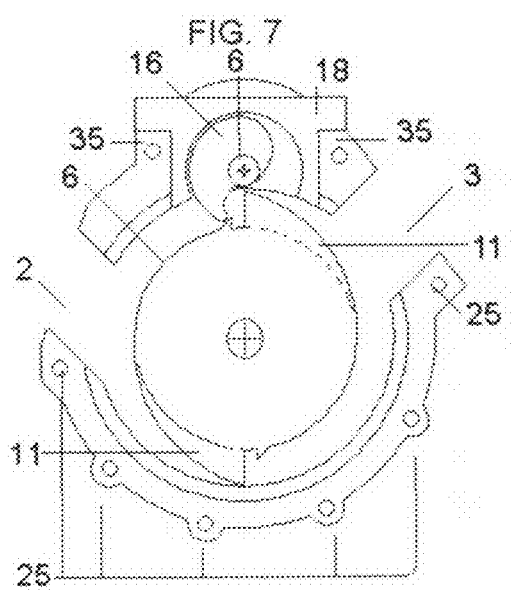
FIG. 7 is a schematic isometric image of the invention as an internal combustion engine in a double sloped back horned piston with a single modified ying yang rotary valve, in mid compound cycle position (simultaneous power and exhaust).

FIG. 7 shows a manifestation of the invention as an internal combustion engine in a double sloped back piston 11 with horned rotor 5 configuration (the horn allows for a flat piston face to better concentrate the force of the combustion on the piston in a perpendicular angle in order to increase efficiency) shown in synchronized rotational interaction with a conformably shaped single modified ying yang rotary valve 16 within its rotary housing 18 midway through its sealing power and exhaust release compound cycle. Additionally shown are bolt holes 25, exhaust port 2, intake port 3, axles 6 and rotary valve housing attachment area 35. Ratio of valve to rotor is two to one (2:1) respectively.

FIG. 8 shows a cut away front view image of the invention as a pump with double triangular pistons 9 and piston tip roller bars 19 with single simple crescent rotary valve 14

(said valve turns twice for every rotor 4/piston 9 assembly rotation) within a rotary valve housing 18 in rotary interaction with said triangular piston 9 attached to a rotor 4 and axle 6 in rotational contact with the annular rotor cylinder housing 1 in a free flow dynamic pressure configuration (free flow refers to easy flow design and angles and dynamic refers to gradual interior port volume changes that allow for pressure differences). Ratio of valve to rotor is two to one (2:1) respectively.

FIG. 9 shows a manifestation of the invention as an internal combustion engine with double sloped back pistons 10 in synchronized rotational interaction with a conformably shaped single ying yang rotary valve 16 within its rotary housing 18 midway through its sealing power and exhaust release compound cycle. Additionally shown are bolt holes 25, exhaust port 2, intake port 3, axles 6 and rotary valve housing attachment area 35. Ratio of valve to rotor is two to one (2:1) respectively.

FIG. 10 is an image of a manifestation of the invention as a pumping device in a double slope back piston 10 configuration attached to a rotor 4 and axle 6 in synchronized rotational interaction with two conformably shaped ying yang rotary valves 16 within their annular rotary valve 18 and cylinder housings 1 said superior (upper) piston 10 shown almost clearing the second isolating rotary valve 13 approaching top seal point 5 as the inferior (lower) piston 13 approaches the exhaust port 2. Ratio of valve to rotor is two to one (2:1) respectively.

FIG. 11 shows image of the invention as a pump with a double lobe piston 12 (said lobe piston design minimizes the volume of fluid that is re-circulated by eliminating spaces in the piston transfer lock area) fully engaging rotationally with a single simple crescent rotary valve 14 within a rotary valve housing 18 said lobe piston 12 attached to a rotor 4 and axle 6 in rotational contact with the annular rotor cylinder housing 1 in a free flow dynamic pressure configuration. Ratio of valve to rotor is two to one (2:1) respectively.

FIG. 12 has the same description as FIG. 1 except that it has a lobe piston 12 instead of a triangular piston 9.

FIG. 13 has the same description as FIG. 2 except that it has two lobe pistons 12 instead of double broad base triangular pistons 9

FIG. 14 shows a manifestation of the invention as a rotary air breathing internal combustion engine with three (3) narrow triangular pistons 8 attached to a rotor 4 and axle 6 in synchronized rotational interaction with two (2) single simple crescent rotary valves 14 utilizing a compression phase 23 as part of the compound cycle combining with simultaneous intake, power stroke 36 and exhaust phase illustrated by the lower rotary valve 14 installed in an exhaust purging function and thus permitting the suction of fresh air into intake port 3 to aid in the next compound compression phase, the superior or top valve 14 is shown in the power or ignition position and firing, the ratio between rotary valves and rotor is directly related to their respective diameters and the number of pistons therefore in this case that being three to one (3:1) Fuel air and ignition lines not shown.

FIG. 15 is an exterior image of the invention as two (2) coupled rotary piston expansible chamber devices manifest as a twin rotary internal combustion engine each of said devices having two (2) pistons 8 (not shown) mounted on a rotor 4 said rotor attached to an axle 6 rotably (not shown) mounted within an annular cylinder housing 1 with a smooth inner surface and in synchronized interaction with a rotary valve 14 (not shown) mounted on its axle 6 rotably attached within a rotary valve housing 18 with a smooth inner surface with a rotational and diametric ratio of valve to rotor of two to one (2:1) respectively. The synchronicity between the rotary valves 14 and the rotor 4 with pistons is achieved by exterior mounted meshed gears 33 on their axles 6 and of equal diameters and of said rotational ratios. Also shown are two (2) combustors 37 exhaust ports/pipes 2

FIG. 16 an exploded edge view schematic isometric representation of a expansible chamber device manifest as an rotary internal combustion engine with a circular/circular toroid (donut shaped) cylinder 1A with combustor 37 and conformably shaped cylindrical sloped back pistons 10A mounted on a rotor 4 and axle 6 through bearings 7 in rotational synchronization with a conformably shaped rotary valve not shown here are valves, fuel and air intakes lines, ignition wires, intake or exhaust ports.

FIG. 17 an exploded edge view schematic isometric representation of a expansible chamber device manifest as an rotary internal combustion engine with an annular cylinder 1 (square or rectangular) with a combustor 37 and a narrow triangular piston 8 mounted on a rotor 4 through bearings 7 in rotational synchronization with a conformably shaped rotary valve 14 not shown here are valves, fuel and air intakes lines, ignition wires, intake or exhaust ports.

FIG. 18 shows isometric schematic 3D image of a narrow triangular 8 piston and rotor 4 with axle 6 and piston tip roller bar 19

FIG. 19 Shows isometric schematic 3D image of a simple (one crescent parabola piston transfer lock) crescent rotary valve 14 with axle 6.

FIG. 20 shows isometric schematic 3D image of a single narrow triangular piston 8 on rotor 4 with axle 6 and piston tip roller bar 19.

FIG. 21 shows isometric schematic 3D image of a double broad triangular piston 9 and piston tip roller bar 19 on rotor 4 with axle 6 in synchronized rotational interaction with a single double crescent rotary valve 15. The gear ratio in this embodiment is one to one (1:1).

FIG. 22 shows isometric schematic 3D image of a two lobe piston 12 on rotor 4 and axle 6 with piston tip packing seal 20 in expanded (exploded view) rotational interaction with a double crescent rotary valve 15 the gear ratio in this embodiment is one to one (1:1).

FIG. 23 shows isometric schematic 3D image of a single simple crescent valve 14 above double narrow triangular pistons 8 with piston tip packing seal 20 on a rotor 4 and axle 6 said single simple crescent valve 14 in expanded synchronized rotational interaction with a simple crescent rotary valve 14 with a ratio for valve to rotor of two to one (2:1) respectively.

FIG. 24 shows stylized isometric schematic 3D image of the invention FIGS. 25, 27 and 29, are hollow exterior assemblies that do not show the rotor, piston, rotary valve, bearings, bolts, manifolds, mounts etc. shown are intake port 3, exhaust port 2, bolt holes 25, cylinder head cap 3A, cylinder housing 1 and bearing/axle area 7A.

FIG. 25 shows stylized isometric schematic 3D image of the exterior of the cylinder head cap 3A reinforced axle and bearing area 7A, bolt holes 25, and partial rotary valve housing attachment area 35.

FIG. 26 shows stylized isometric schematic 3D image of the ying yang rotary valve 16 in synchronized rotational interaction with a conformably shaped sloped back piston 10 on rotor 4 attached to axle 6

FIG. 27 shows stylized isometric schematic 3D image of the annular cylinder 1 with intake port 3 and exhaust port 2 rotary valve housing attachment area 35 and bolt holes 25.

FIG. 28 shows stylized isometric schematic 3D image of the horned sloped back piston 11 on rotor 4 attached to axle 6 for modified ying yang valve 17 (not shown).

FIG. 29 shows stylized isometric schematic 3D image of the exterior cylinder head cap 3A as interior view of FIG. 25 with rotary valve assembly attachment area 35.

FIG. 30 shows an isometric schematic image of the invention as convertible free flow Rotary Valve Continuous Flow Expansible Chamber and Dynamic Displacement Rotary Device as mentioned in FIG. 2 with two (2) balanced triangular pistons 9 with piston tip roller bars 19 on a rotor 4 attached to an axle 6 rotably attached within an smooth inner surfaced annular cylinder 1 in synchronized rotational interaction with a conformably shaped single, double crescent rotary valve 15 within a rotary valve housing 18 an intake port 3 and an exhaust port 2. The part that makes it convertible is the cycle extender insert 40 said part converts the preferred diametric 180 degree piston separation between intake and exhaust ports for internal combustion mode to approximately 225+degrees (45 degrees additional) that allow for of more volume flow for every revolution in most of the invention's manifestations as a rotary expansible chamber device also this configuration minimizes or eliminates the need for check valves in most applications rotor and rotary gear rotational ratio is also one to one (1:1) as in FIGS. 1 and 2.

FIG. 31 shows an isometric 3D schematic image of the invention as a free flow Rotary Valve Continuous Flow Expansible Chamber and Dynamic Displacement Rotary Device as mentioned in FIG. 2 with two (2) balanced triangular pistons 9 on a rotor 4 attached to an axle 6 rotably attached within an smooth inner surfaced annular cylinder 1 in synchronized rotational interaction with a conformably shaped single, double crescent rotary valve 15 within a rotary valve housing 18 with an intake port 3 and an exhaust port 2. With approximately 225+degrees of volume flow for every revolution in most of the invention's manifestations as a rotary expansible chamber device also this configuration minimizes or eliminates the need for check valves in most applications rotor and rotary gear (not shown) rotational ratio is also one to one (1:1) as in FIGS. 1 and 2.

FIG. 32 this isometric 3D representation of the invention shows sequential images (1 through 9) of the relative synchronous rotational functioning of rotary valve to piston/rotor assembly with a ratio of one (1) to one (1) respectively, as in FIG. 31.

FIG. 33 shows stylized isometric schematic 3D image of the invention as a two (2) broad piston 8 on sprocket rotor 4A attached to an axle 4 rotably attached within an smooth inner surfaced annular cylinder 1 in synchronized rotational interaction with a conformably shaped single, simple crescent rotary valve 14 within a rotary valve housing 18 with an intake port 3 and an exhaust port 2 shown with a rotary valve to piston/rotor ratio of two (2) to one (1) to respectively. Front and rear cylinder head caps not shown (FIG. 25 and FIG. 29) an internal integrated synchronizing gear toothed surface structure on the periphery of the rotor 4A excluding the piston that match and come in meshed contact with gear teeth on the back periphery of the rotary valve 14A excluding the inner area of the smoothly surfaced transfer lock said piston shall then provide measured guided movement to said valve until said piston exits said smooth piston transfer lock area (these are the cut out crescent area of the crescent valves 14, 14A and 15) wherein said geared peripheral rotor gear teeth on said rotor 4A come in meshed contact once again with gear teeth on back of rotary valve 14A this manifestation of the invention demonstrates a simple synchronizing form of the invention as an expansible chamber device. The invention further comprising an exterior partial synchronizing gear 44 that reinforces further the interaction between the geared rotor 4A/piston 9 assembly and the rotary valve 14A by compensating for the gaps in said meshing gear teeth of said rotor piston assembly and said rotary valve 34 image shows an isometric representation of external synchronizing partial gear assembly comprised of an exterior synchronizing rotor/rotary valve partial gear drive 33 and an exterior rotor synchronizing partial gear drive 34 that reinforce and compensate for the gap due to the lack of gear teeth on the internal smooth inner areas of said valve transfer lock and said pistons.

LIST OF REFERENCE NUMERALS

1. Annular cylinder housing
2. Exhaust port, exhaust pipe
3. Intake port
3A Cylinder head cap
4. Rotor
4A Sprocket rotor (interior)
5. Modified horned rotor
6. Axle
7. Bearing
7A Bearing support area
8. Narrow triangular piston
9. Broad triangular piston
10. Sloped back piston
10A. Toroid sloped back piston
10B. Piston top
11. Modified sloped back piston
12. Lobe piston
13. Nautilus valve
14. Single crescent rotary valve (transfer lock)
14A. Interior crescent gear toothed rotary valve
15. Double crescent rotary valve (transfer locks)
16. Ying yang valve
17. Modified ying yang valve
18. Rotary valve housing
19. Piston roller bar (friction reducing)
20. Piston packing seal
21. Groove for piston/cylinder sealing ring
22. Pressure relieving backflow channel
23. Compression pressure area
24. vacuum area
25. Bolt holes
26. Water jacket channels
27. Clearance between piston & rotary valve
28. Vacuum relief channel
29. Support base/mount
30. Spark device
31. Fuel injector nozzle
32. Structural/guide diffuser
33. Exterior synch. rotor/rotary valve gear
34. Exterior rotor synch. partial gear drive
34A. Exterior valve synch. partial gear drive
35. Rotary valve housing attachment area
36. Power stroke of compound cycle
37. Combustor
38. Compound cycle
39. passive compression
40. cycle extender insert
41. Exhaust point of compound cycle
42. top (initial) seal point
43. Accumulator area

I claim:

1. A rotary valve continuous flow expansible chamber device, comprising:
   a. a U shaped hollow annular cylinder housing of continuous unrestricted flow and displacement where separation is 180 degrees between intake port and exhaust port in which said housing forms a constant volumetric continuation wall for uninterrupted flow in which inlet walls become tangent straight input to tangent straight output of exhaust walls;
   b. a rotor shaft axially aligned with a center of the cylinder housing, wherein the rotor shaft is rotably connected to, and extends through, the cylinder housing;
   c. a rotor in communication with the rotor shaft, wherein the rotor is configured to rotate with the rotor shaft;
   d. at least two pistons extending radially from an outer edge of the rotor;
   e. at least one hollow rotary valve housing in communication with the cylinder housing;
   f. at least one rotary valve shaft axially aligned with the at least one rotary valve housing, wherein the at least one rotary valve shaft is rotatably connected to, and extends through, the at least one rotary valve housing;
   g. at least one rotary valve in communication with the at least one rotary valve shaft, wherein the at least one rotary valve is configured to rotate with the at least one rotary valve shaft, and wherein the rotation of the rotor is configured to engage the at least two pistons with the at least one rotary valve;
   h. a synchronizing control gear assembly configured to synchronize the rotation of the at least one rotary valve with the rotation of the rotor;
   i. the intake port extending through an exterior wall of the cylinder housing, forming one end of the U shaped hollow annular cylinder housing wherein the intake port that allows fluid substances to enter into the U shaped hollow annular cylinder housing;
   j. the exhaust port extending through an exterior wall of the U shaped hollow annular cylinder housing forming the other end of the U-shaped hollow annular cylinder housing, wherein the exhaust port is configured to allow a discharge of the fluid substances from the U shaped hollow annular cylinder housing, wherein the intake port and the exhaust port are configured to maintain a constant volumetric displacement of substances within the rotary valve continuous flow expansible chamber device.

2. The rotary valve continuous flow expansible chamber device of claim 1, wherein a sealing element is selected from the group consisting of a piston packing seal and a piston roller bar.

3. A rotary valve continuous flow expansible chamber device, comprising as in claim 1 wherein;
   a combustor in communication with the intake port, the combustor comprising:
   i. a fuel intake;
   ii. an air intake; and
   iii. an igniter configured to ignite a mixture of fuel and air entering the U shaped hollow annular cylinder housing.

4. A rotary valve continuous flow expansible chamber device as in claim 1 wherein;
   a combustor in communication with the intake port, the combustor comprising:
   a. a fuel intake;
   b. an air intake; and
   c. an igniter configured to ignite a mixture of fuel and air entering the U shaped hollow annular cylinder housing.

5. A rotary valve continuous flow expansible chamber device of claim 1 wherein the fluid substances include fuel with water.

6. A convertible rotary valve continuous flow expansible chamber device convertible between a rotary valve internal combustion device and a rotary valve pump, comprising:
   a. a hollow annular cylinder housing;
   b. a rotor shaft axially aligned with a center of the hollow annular cylinder housing, wherein the rotor shaft is rotatably connected to, and extends through, the hollow annular cylinder housing;
   c. a rotor in communication with the rotor shaft, wherein the rotor is configured to rotate with the rotor shaft;
   d. at least two pistons extending radially from an outer edge of the rotor;
   e. at least one hollow rotary valve housing in communication with the hollow annular cylinder housing;
   f. at least one rotary valve shaft axially aligned with the at least one rotary valve housing, wherein the at least one rotary valve shaft is rotatably connected to, and extends through, the at least one rotary valve housing;
   g. at least one rotary valve in communication with the at least one rotary valve shaft;
   h. a synchronizing control gear assembly configured to synchronize the rotation of the at least one rotary valve with the rotation of the rotor;
   i. a cycle extender insert on an interior wall of the hollow annular cylinder housing; wherein when said cycle extender is inserted into the interior wall a degree of piston separation between the intake port and the exhaust port changes from 180 degrees to at least 225 degrees allowing the convertible rotary valve continuous flow expansible chamber device to change from the rotary valve internal combustion device to the rotary valve pump, wherein an increase in piston separation between the intake port and the exhaust port results in increased volumetric displacement of one or more fluid substances within the convertible rotary valve continuous flow expansible chamber device;
   j. said intake port extending through an exterior wall of the hollow annular cylinder housing, wherein said intake port is configured to maintain volumetric capacity allowing the one or more fluid substances to enter into the cylinder housing;
   k. an exhaust port extending through an exterior wall of the cylinder housing, wherein the exhaust port is configured to maintain volumetric capacity and allow the discharge of the one or more fluid substances from the cylinder housing, wherein the intake port and the exhaust port are configured to maintain a constant volumetric displacement of the one or more fluid substances within the convertible rotary valve continuous flow expansible chamber device.

7. A rotary valve continuous flow expansible chamber device as in claim 6 wherein;
   a combustor in communication with the intake port, the combustor comprising:
   a. a fuel intake;
   b. an air intake; and
   c. an igniter configured to ignite a mixture of fuel and air entering the hollow annular cylinder housing.

8. The rotary valve continuous flow expansible chamber device of claim 6, wherein a sealing element is selected from a group consisting of a roller bar and packing seals.

9. A rotary valve continuous flow expansible chamber device of in claim 6 wherein the one or more fluid substances include fuel with water.

10. A rotary valve continuous flow expansible chamber device, comprising:
- a. a U shaped hollow annular cylinder housing of continuous unrestricted Free flow and displacement, said U shaped hollow annular cylinder housing forms a constant volumetric continuation wall for uninterrupted flow in which inlet walls become tangent straight input to tangent straight output of exhaust walls;
- b. a rotor shaft axially aligned with a center of the U shaped hollow annular cylinder housing, wherein the rotor shaft is rotably connected to, and extends through, the U shaped hollow annular cylinder housing;
- c. a rotor in communication with the rotor shaft, wherein the rotor is configured to rotate with the rotor shaft;
- d. at least two pistons extending radially and diametrically from each other from an outer edge of the rotor,
- e. at least one hollow rotary valve housing in communication with the U shaped hollow annular cylinder housing;
- f. at least one rotary valve shaft axially aligned with the at least one rotary valve housing, wherein the at least one rotary valve shaft is rotatably connected to, and extends through, the at least one rotary valve housing;
- g. at least one rotary valve in communication with the at least one rotary valve shaft, wherein the at least one rotary valve is configured to rotate with the at least one rotary valve shaft, and wherein the rotation of the rotor is configured to engage the at least two pistons with the at least one rotary valve;
- h. a synchronizing control gear assembly configured to synchronize the rotation of the at least one rotary valve with the rotation of the rotor;
- i. the intake port extending through an exterior wall of the U shaped hollow annular cylinder housing, forming one end of the U shaped hollow annular cylinder housing wherein the intake port that allows one or more fluid substances to enter into the U shaped hollow annular cylinder housing,
- j. the exhaust port extending through an exterior wall of the U shaped hollow annular cylinder housing forming other end of the U-shaped hollow annular cylinder housing, wherein the exhaust port is configured to allow a discharge of the one or more fluid substances from the U shaped hollow annular cylinder housing, wherein the intake port and the exhaust port are configured to maintain a constant volumetric displacement of the one or more fluid substances within the rotary valve continuous flow expansible chamber device.

11. The rotary valve continuous flow expansible chamber device of claim 10, wherein a sealing element is selected from a group consisting of a roller bar and packing seals.

\* \* \* \* \*